United States Patent
Thubert et al.

(10) Patent No.: US 9,590,692 B2
(45) Date of Patent: Mar. 7, 2017

(54) DISTRIBUTED APPROPRIATION AND DEFENSE OF TIME SLOT OWNERSHIP IN A CHANNEL HOPPING SCHEDULE

(71) Applicant: Cisco Technology, Inc., San Jose, CA (US)

(72) Inventors: Pascal Thubert, La Colle sur Loup (FR); Jean-Philippe Vasseur, Saint Martin d'Uriage (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 14/336,226

(22) Filed: Jul. 21, 2014

(65) Prior Publication Data
US 2016/0020864 A1    Jan. 21, 2016

(51) Int. Cl.
*H04B 1/713*  (2011.01)
*H04W 4/00*  (2009.01)
*H04B 1/707*  (2011.01)

(52) U.S. Cl.
CPC ............. *H04B 1/713* (2013.01); *H04B 1/707* (2013.01); *H04W 4/008* (2013.01)

(58) Field of Classification Search
CPC ........ H04B 1/707; H04B 1/713; H04W 4/008
See application file for complete search history.

(56) References Cited

U.S. PATENT DOCUMENTS

| | | | |
|---|---|---|---|
| 5,530,700 A * | 6/1996 | Tran | H04W 74/0833 370/341 |
| 6,253,189 B1 * | 6/2001 | Feezell | G06Q 30/02 705/14.61 |
| 6,560,628 B1 * | 5/2003 | Murata | G06F 9/4887 718/100 |
| 7,305,002 B1 * | 12/2007 | Ageby | H04Q 11/08 370/235 |
| 8,040,857 B2 | 10/2011 | Wang et al. | |
| 8,065,515 B2 * | 11/2011 | Droms | H04L 29/12283 370/392 |
| 8,130,654 B2 * | 3/2012 | Garcia-Luna-Aceves | H04L 45/306 370/236 |
| 9,258,098 B2 * | 2/2016 | Thubert | H04L 5/0055 |
| 2003/0137993 A1 | 7/2003 | Odman | |
| 2013/0026220 A1 | 1/2013 | Whelihan | |
| 2016/0269096 A1 * | 9/2016 | Thubert | H04B 7/15507 |

OTHER PUBLICATIONS

Dujovne et al. "6TiSCH On-the-Fly Scheduling draft-dujovne-6tisch-on-the-fly-02", Feb. 14, 2014, pp. 1-10.
(Continued)

*Primary Examiner* — Mounir Moutaouakil
(74) *Attorney, Agent, or Firm* — Parker Ibrahim & Berg LLC; James M. Behmke; Stephen D. LeBarron

(57) ABSTRACT

In one embodiment, a device in a network receives an indication of an appropriation and defense time slot for a set of time slots in a channel hopping schedule. The device appropriates ownership of the set of time slots using an appropriation window of the appropriation and defense time slot. The device receives an appropriation request from a second device during the appropriation window. In response to receiving the appropriation request, the device sends a defense notification during a defense window of the appropriation and defense time slot.

27 Claims, 17 Drawing Sheets

(56) References Cited

OTHER PUBLICATIONS

Thubert et al. "An Architecture for IPv6 over the TSCH mode of IEEE 802.15.4e draft-ietf-6tisch-architecture-03" Jul. 4, 2014, pp. 1-30.
Vilajosana et al. "Minimal 6TiSCH Configuration draft-ietf-6tisch-minimal-02", Jul. 4, 2014, pp. 1-20.
Palattella et al. "Terminology in IPv6 over the TSCH mode of IEEE 802.15.4e draft-ietf-6tisch-terminology-02", Jul. 4, 2014, pp. 1-12.
Watteyne et al. "Using IEEE802.15.4e TSCH in an LLN context: Overview, Problem Statement and Goals draftietf-6tisch-tsch-01", Jul. 4, 2014, pp. 1-22.

* cited by examiner

DISTRIBUTED APPROPRIATION AND DEFENSE OF TIME SLOT OWNERSHIP IN A CHANNEL HOPPING SCHEDULE

TECHNICAL FIELD

The present disclosure relates generally to computer networks, and, more particularly, to the distributed appropriation and defense of time slot ownership in a channel hopping schedule.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Low power and lossy networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. Changing environmental conditions may also affect device communications in an LLN. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
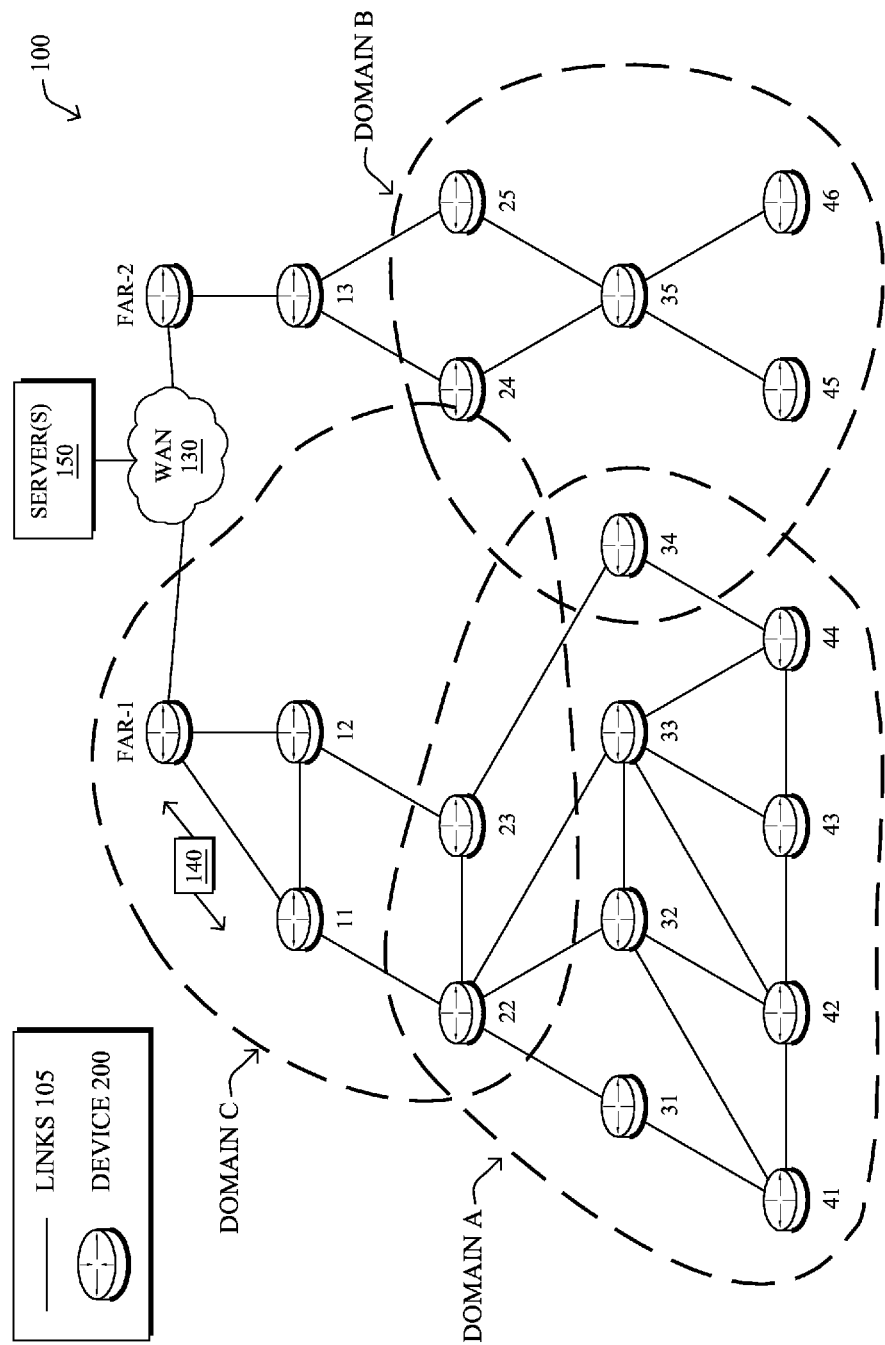
FIG. 1 illustrates an example communication network.

According to one or more embodiments of the disclosure, a device in a network divides a channel hopping schedule into sets of time slots. The time slots in a particular set are associated with corresponding wireless channels. The device selects a time slot in the particular set of time slots as an appropriation and defense time slot that can be used by nodes in the network to vie for ownership of the particular set of time slots. The device divides the selected time slot into a plurality of sub-slots. The device assigns an appropriation window to one or more of the sub-slots that can be used by a first one of the network nodes to claim ownership of the set of time slots. The device assigns a defense window to one or more of the sub-slots that can be used by the first network node to defend against a claim of ownership of the particular set of time slots by a second one of the network nodes.

In further embodiments, a device in a network receives an indication of an appropriation and defense time slot for a set of time slots in a channel hopping schedule. The device appropriates ownership of the set of time slots using an appropriation window of the appropriation and defense time slot. The device receives an appropriation request from a second device during the appropriation window. In response to receiving the appropriation request, the device sends a defense notification during a defense window of the appropriation and defense time slot.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR-1," 'FAR-2," and "11," "12," . . . "46," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while network 100 is shown in a certain orientation, particularly with a field area router (FAR) node, the network 100 is merely an example illustration that is not meant to limit the disclosure. Also as shown, a particular FAR (e.g., FAR-1) may communicate via a WAN 130 with any number of servers 150, such as a path computation element (PCE), network management service (NMS), or other supervisory device.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. One communication technique that may be used to implement links 105 is channel-hopping. Also known as frequency hopping, use of such a technique generally entails wireless devices "hopping" (e.g., alternating) between different transmission and reception frequencies according to a known schedule. Network 100 may also be divided into any number of wireless domains (e.g., domains A-C) in which nodes 200 may communicate.

Figure 2:
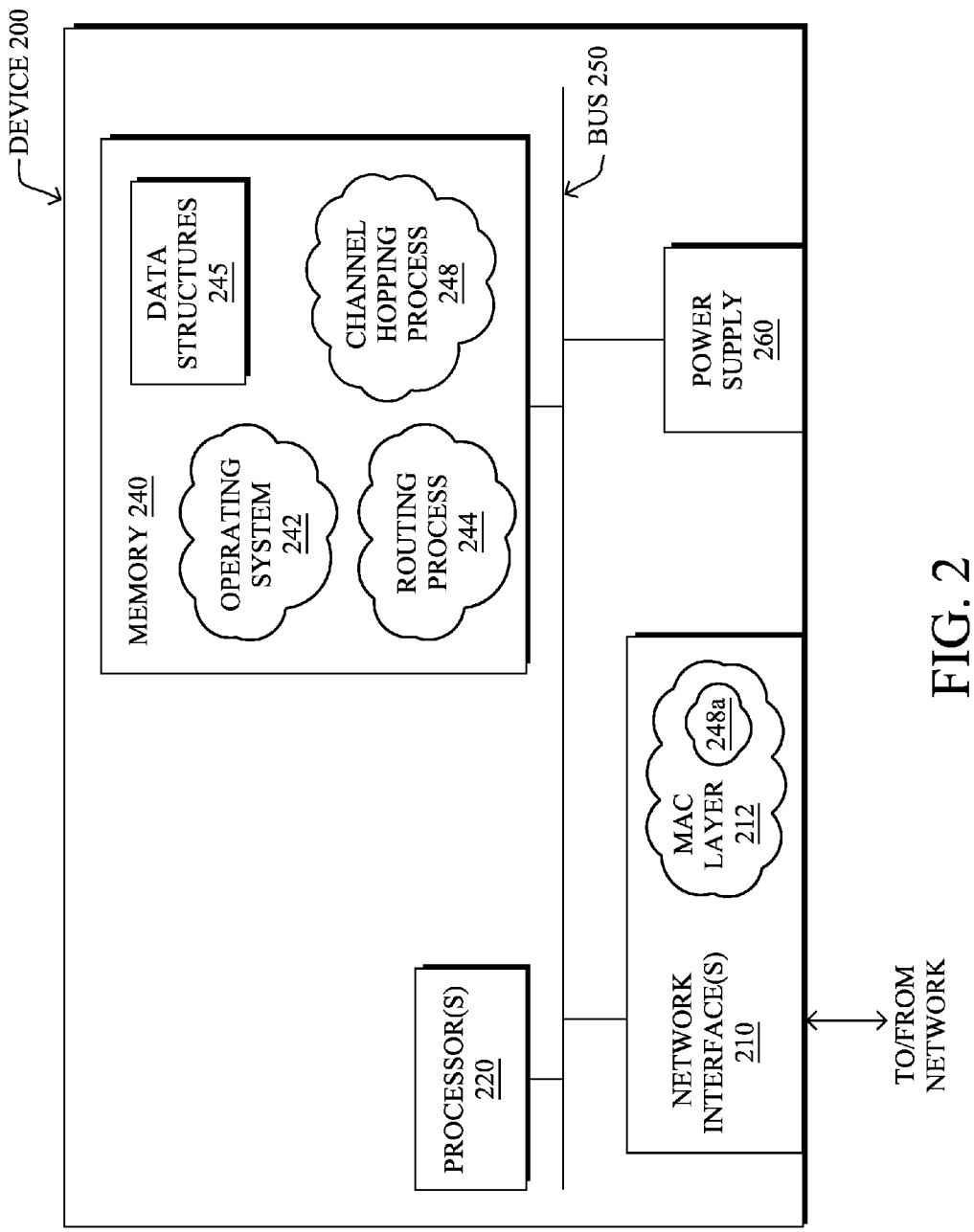
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210, e.g., transceivers, include the mechanical, electrical, and signaling circuitry for communicating data over links 105 coupled to the network 100. The network interfaces may be configured to transmit and/or receive data using a variety of different communication protocols, particularly for frequency-hopping communication as described herein. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 includes a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may include hardware elements or hardware logic configured to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may include routing process/services 244, and an illustrative channel hopping process 248 as described in greater detail below. Note that while channel hopping process 248 is shown in centralized memory 240, alternative embodiments provide for the process to be specifically operated within the network interfaces 210, such as within a MAC layer 212 (as "process 248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the s industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012). Further, an example OF (e.g., a default OF) may be found in an IETF RFC, entitled "RPL Objective Function 0" <RFC 6552> by Thubert (March 2012) and "The Minimum Rank Objective Function with Hysteresis" <RFC 6719> by O. Gnawali et al. (September 2012).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
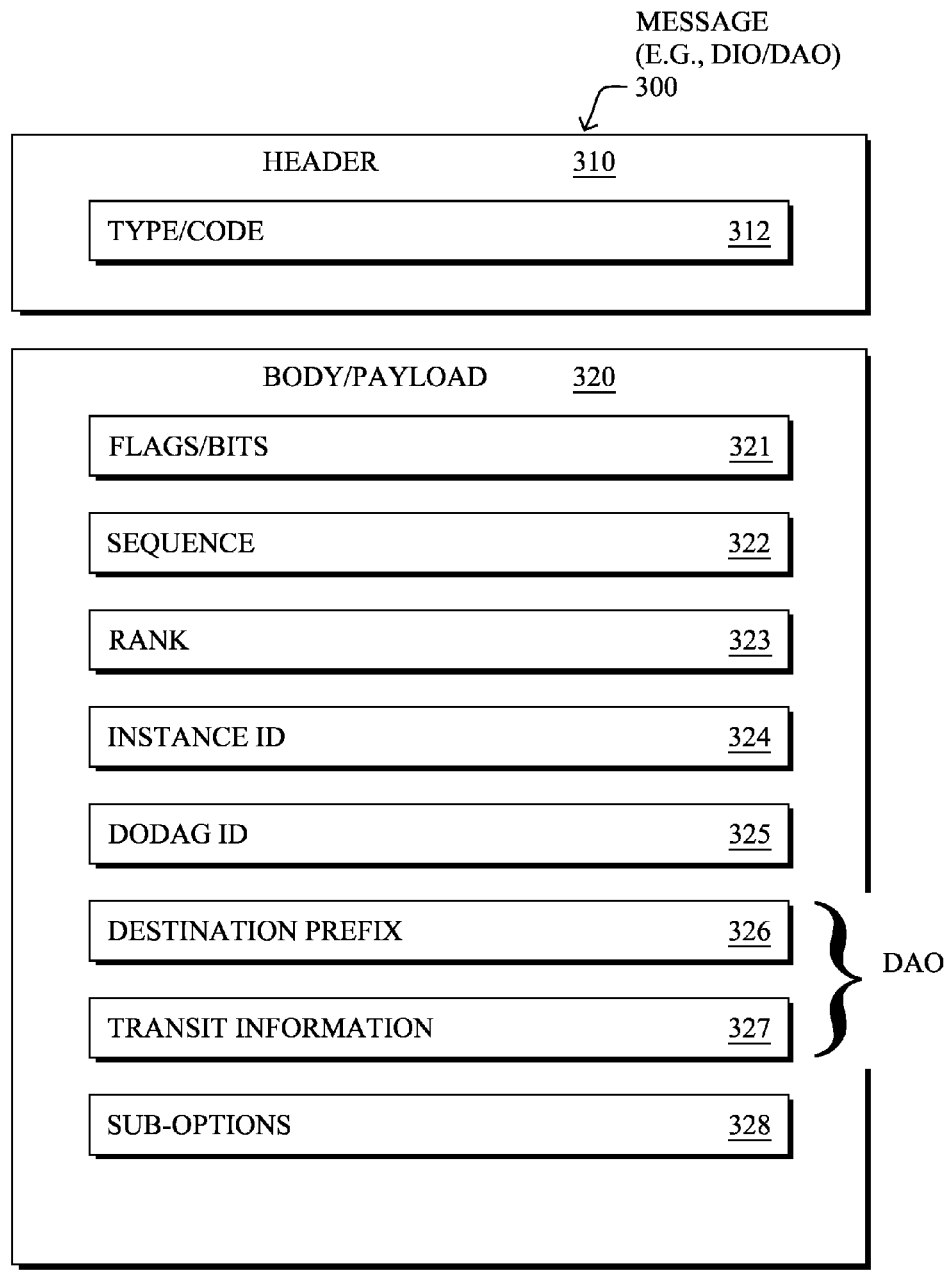
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
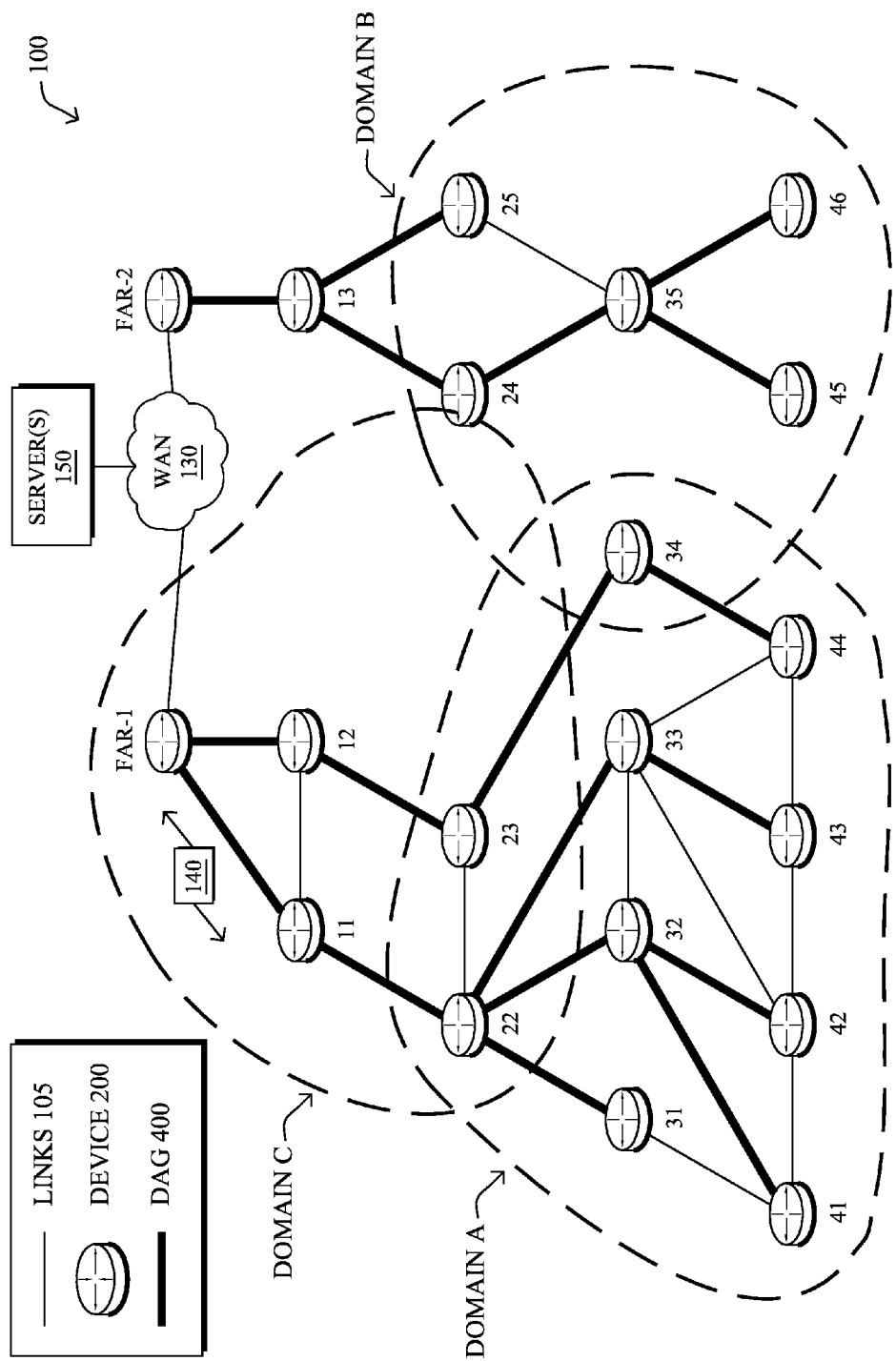
FIG. 4 illustrates an example directed acyclic graph (DAG) in the communication network of FIG. 1.

FIG. 4 illustrates an example simplified DAG 400 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 400 (shown as bolded lines), which extends from the root node toward one or more leaf nodes (nodes without children). Traffic/packets 140 (shown in FIG. 1) may then traverse the DAG 400 in either the upward direction toward the root or downward toward the leaf nodes, particularly as described herein.

According to various embodiments, communications within network 100 may be deterministic. Notably, low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE802.15.4 may thus be adapted to support determinism. In particular, the bandwidth can be pre-formatted in a time division multiplexing (TDM) fashion using IEEE802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH". The centralized computation is typically done by a PCE with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol (RFC6550). The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery).

Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

For the underlying MAC operation, 6TiSCH relies, as its name shows, on time slotted channel hopping (TSCH). More specifically, 6TiSCH is being designed for the IEEE802.15.4e TSCH mode of operation. This is the standardized version of the MAC that was adopted by all industrial WSN standards, ISA100.11a, WirelessHART and WIAPA.

The time slotted aspect of the TSCH technology is a time division multiplexing (TDM) technique, which requires all nodes in the network to be time synchronized. In other words, time is sliced up into time slots with a given time slot being long enough for a MAC frame of maximum size to be sent from mote B to node A, and for node A to reply with an acknowledgment (ACK) frame indicating successful reception.

TSCH is different from traditional low-power MAC protocols because of its scheduled nature. In TSCH, all nodes in the network follow a common communication schedule, which indicates for each active (e.g., transmit or receive) timeslot a channel offset and the address of the neighbor to communicate with. The channel offset is translated into a frequency using a specific translation function which causes pairs of neighbors to "hop" between the different available channels (e.g., frequencies) when communicating. Such channel hopping technique efficiently combats multi-path fading and external interference. Notably, since 6TiSCH is based on TSCH, 6TiSCH also uses the basic TSCH concepts of a schedule and time slots. However, since 6TiSCH may extend over several interference domains with distributed routing and scheduling, there is no longer the concept of a single schedule that would centralize all the transmissions and receptions. In particular, with 6TiSCH, some TSCH concepts may still apply globally and their configurations must be shared by all nodes in the network, but other concepts may be local to a given node in 6TiSCH. For example, the hopping schedule in 6TiSCH may represent only the transmission to which a particular node is participating.

Figure 5:
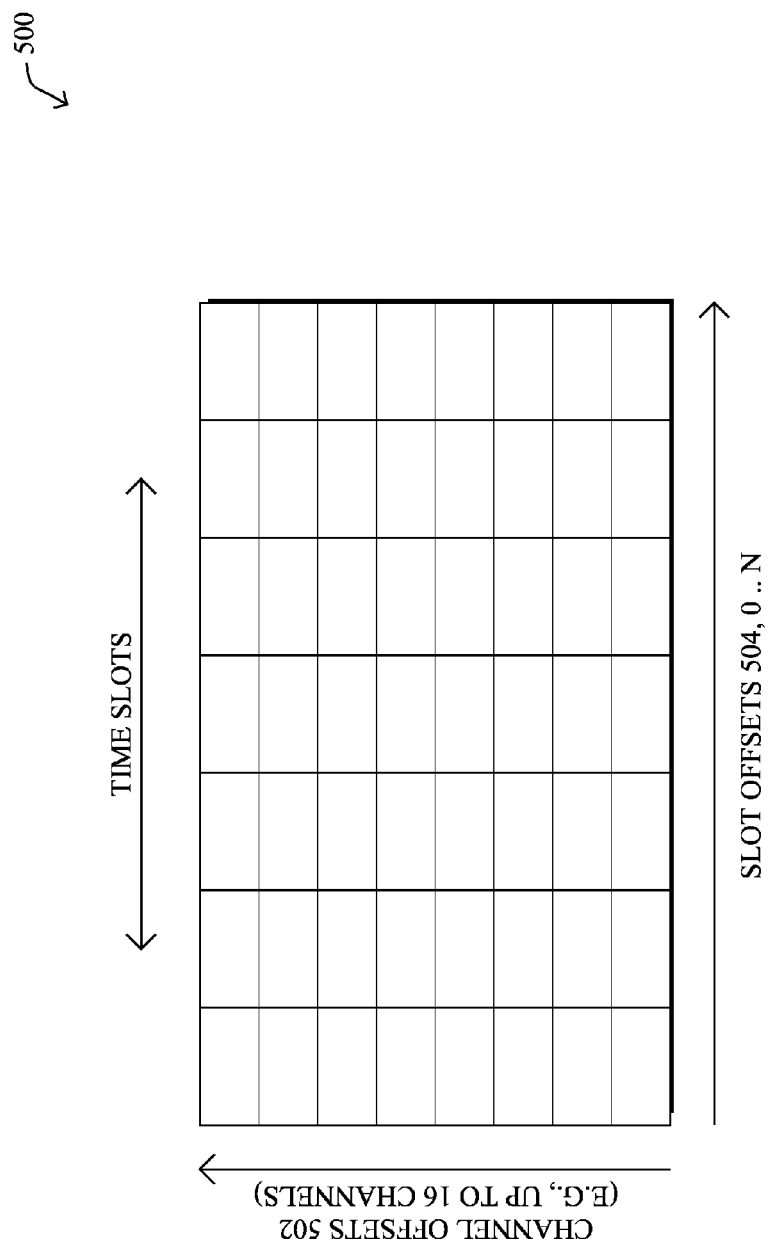
FIG. 5 illustrates an example channel distribution/usage (CDU) matrix.

Referring now to FIG. 5, an example channel distribution/usage (CDU) matrix 500 is shown that may be used by the nodes/devices 200 in network 100. Notably, 6TiSCH defines a new global concept of a CDU matrix that may repeat itself over time and represents the global characteristics of the network such as used/unused channels, timeslot durations, number of time slots per iteration, etc. As shown, CDU matrix 500 may include an index of channel offsets 502 along a first axis that correspond to the channels available for use in network 100 (e.g., offsets for each of sixteen available channels). As would be appreciated, any number of channels may be used in the network. Along the other axis are slot offsets 504 that correspond to differing time slots, the combination of which is equal to one period of the network scheduling operation.

CDU matrix 500 may be used to define the basic wireless communication operations for the network. For example, CDU matrix 500 may be used to define the duration of a timeslot (e.g., between 10 to 15 ms), the period of an iteration (e.g., the total number of time slots, indexed by slot offsets 504), and the number of channels (e.g., indexed by channel offset 502) to which the MAC may jump.

A "cell" in CDU matrix 500 is defined by the pair (slot offset, channel offset) in the epochal description of CDU matrix 500, in other words, at time t=0. During runtime, the actual channel at which a given transmission happens may be rotated to avoid interferences such as self-inflicted multipath fading.

Figure 6:
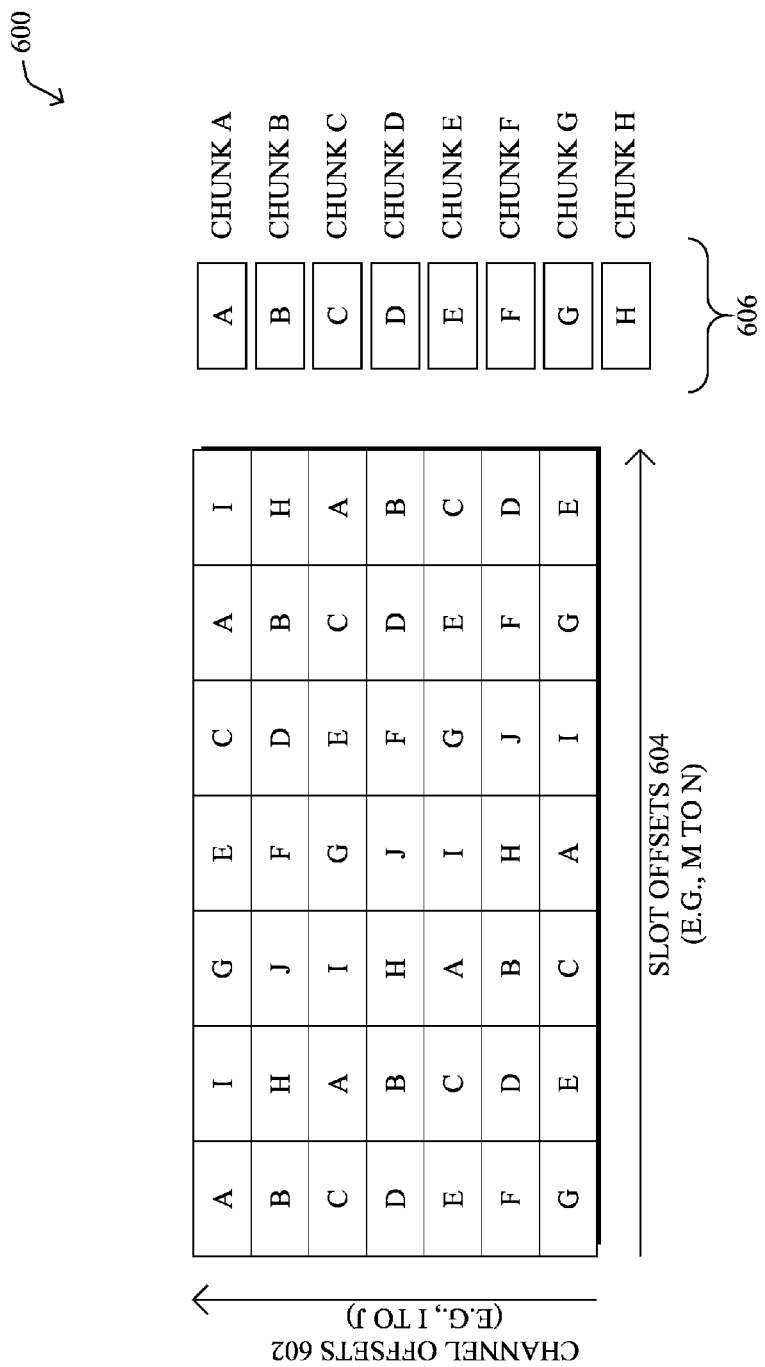
FIG. 6 illustrates example chunks of the CDU matrix of FIG. 5.

Referring now to FIG. 6, an example subset 600 of CDU matrix 500 is shown to be divided into chunks 606. In order to scale the network, the computation of the channel hopping schedule for the network may be distributed. According to some embodiments, such as those in which 6TiSCH is used, a parent node (e.g., an RPL parent) may be responsible for computing the schedule between the parent and its child node(s) in both directions. In order to allocate a cell for a given transmission, the parent node must be certain that this cell will not be used by another parent in the interference domain. As shown, for example, cells within CDU matrix 500 may be "owned" by different parent nodes within the network. The collective cells of CDU matrix 500 assigned to different parent nodes may then be grouped together as chunks 606. In one implementation, for example, CDU matrix 500 may be formatted into chunks by making a full partition of matrix 500. The resulting partition must be well known by all the nodes in the network, to support the appropriation process, which would rely on a negotiation between nodes within an interference domain.

Typically, there will be at most one cell in a chunk per column of CDU matrix 500, to reflect that a device with a single radio may not use two channels at the same time. The cells may also be well distributed in time and frequency, so as to limit the gaps between transmissions and avoid the sequential loss of frames in multipath fading due to the consecutive reuse of a same channel.

Chunks 606 may be defined at the epochal time (e.g., at the time of creation of CDU matrix 500) and the 802.15.4e operation may be repeated iteratively any number of times. Typically, the effective channel for a given transmission may be incremented by a constant that is prime with the number of channels, modulo the number of channels at each iteration. As a result, the channel of a given transmission changes at each iteration and the matrix virtually rotates.

Figure 7:
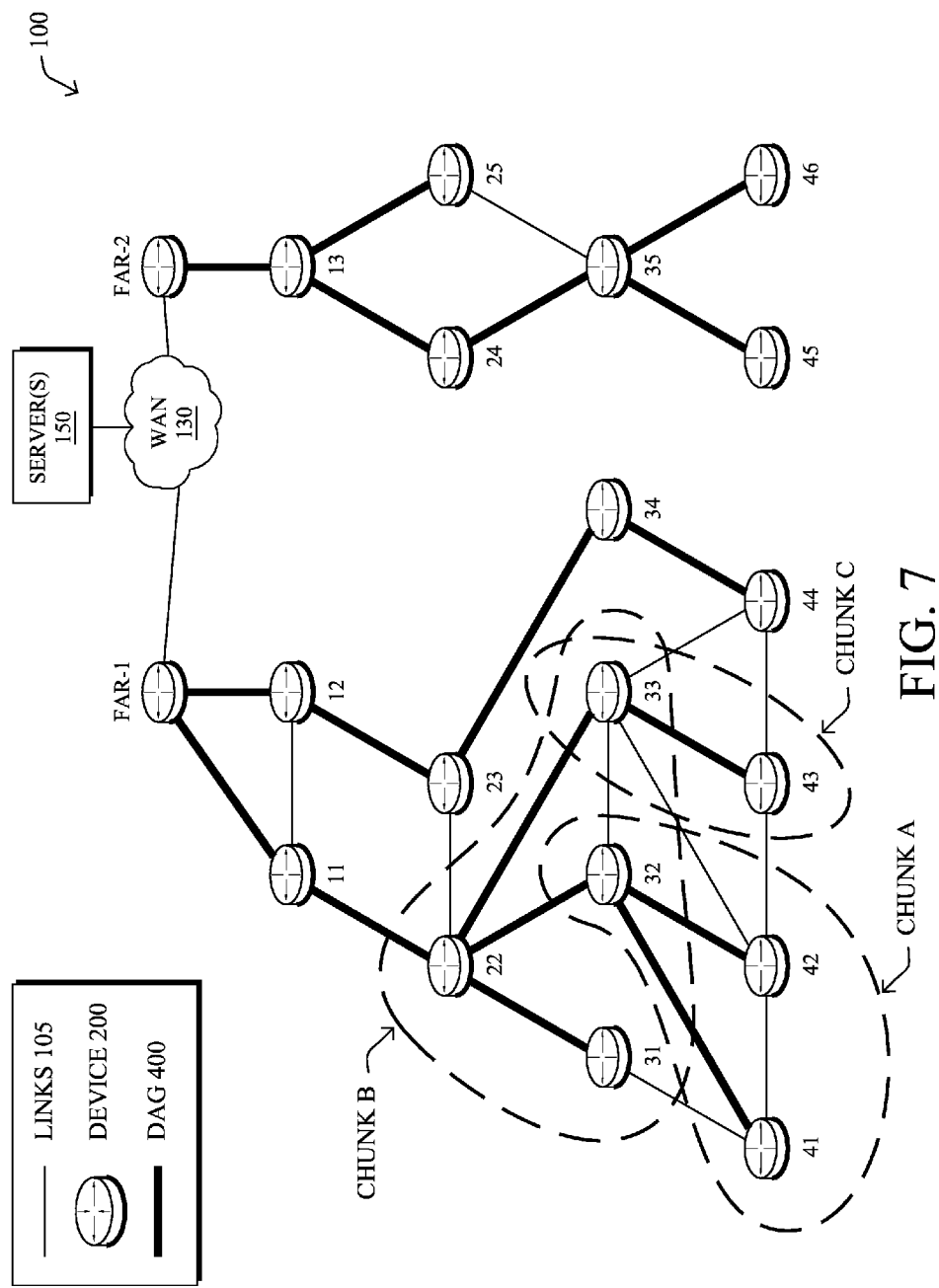
FIGS. 7-8 illustrate examples of a parent node in the network of FIG. 1 scheduling communications for a particular chunk.
Figure 8:
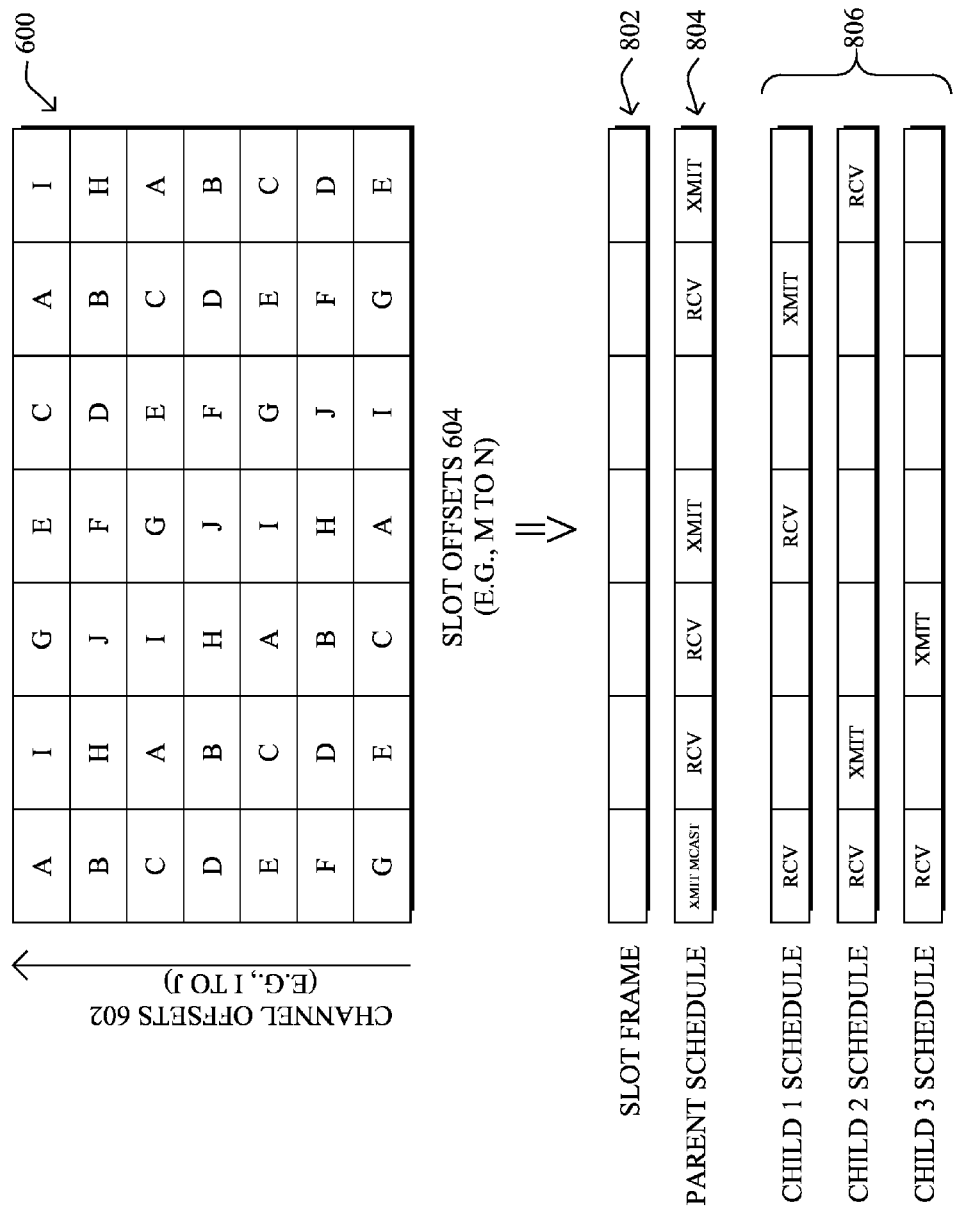

FIGS. 7-8 illustrate examples of a parent node in the network of FIG. 1 scheduling communications for a particular chunk. As shown, assume that node 32 is the parent node of child nodes 41, 42 according to the routing protocol. Node 32 may be assigned a chunk (e.g., chunk A) of CDU matrix 500, thereby allowing node 32 to manage the usage of the corresponding cells in the chunk within its interference domain. Thus, node 32 may decide which transmissions will occur over the cells in the chunk between itself and its child node(s). Ultimately, a chunk represents some amount of bandwidth and can be seen as the generalization in the time/frequency domain of the classical channel that is used to paint a wireless connectivity graph, e.g. to distribute TV frequencies over a country or WiFi channels in an ESS deployment.

If chunks are designed to form a partition of the CDU matrix 500, multiple different chunks may be in use in the same area of network 100 and under the control of different parents. In one embodiment, the appropriation process may be such that any given node that communicates using cells in a given chunk, as appropriated and managed by a parent A, should not be within the interference domain of any other node that is also communicating using the same chunk but appropriated and managed by a different parent B. Consequently, the number of parents in any given area of the network may be constrained by the number of chunks.

Referring more specifically to FIG. 8, parent node 32 may use a slot frame 802 to assign hopping schedules 804, 806 to itself and any of its child node(s), respectively. Generally speaking, slot frame 802 is a MAC-level abstraction that is also internal to the node and includes a series of time slots of equal length and priority. For example, the size of the slot frame 802 may match the CDU matrix 500. Parent node 32 may use slot frame 802 to divide the corresponding times into slots and associate the slots to a particular operation (e.g., reception, transmission, multicast operation, etc.). For example, as shown, parent node 32 and one of its child nodes may be synchronized to use the same channel during a given time slot.

Slot frame 802 may be characterized by a slotframe_ID, a slot duration, and a slotframe_size. In some implementations, multiple slot frames may coexist in a node's schedule. In other words, a node can have multiple activities scheduled in different slot frames, based on the priority of its packets/traffic flows. The different slot frames may be implemented as having the same durations/sizes or different durations/sizes, in various cases. The time slots in the slot frame may also be indexed by the slot offsets 604 (e.g., the first time slot in slot frame 802 may be indexed as slot offset 0, etc.).

In various implementations, different parent nodes may appropriate different chunks such that the chunks used throughout the network do not interfere. For example, chunks may be appropriated by different parent nodes such that, for a given chunk, the domains do not intersect. In addition, the domains for different chunks are generally not congruent since the chunks are owned by different nodes. As a result, the schedule in a node with a single radio is a series of transmissions, and the parent to child cells are taken from (one of) the chunk(s) that the parent has appropriated.

6TiSCH also defines the peer-wise concept of a "bundle," that is needed for the communication between adjacent nodes. In general, a bundle is a group of equivalent scheduled cells (e.g., cells identified by different slot offset/channel offset pairs), which are scheduled for a same purpose, with the same neighbor, with the same flags, and the same slot frame. The size of the bundle refers to the number of cells it includes. Given the length of the slot frame, the size of the bundle also translates directly into bandwidth, either logical or physical. Ultimately a bundle represents a half-duplex link between nodes, one transmitter and one or more receivers, with a bandwidth that amount to the sum of the time slots in the bundle. Adding a timeslot in a bundle increases the bandwidth of the link.

Track forwarding is the simplest and fastest forwarding model defined in the 6TiSCH architecture that specifies IPv6 over TSCH. In general, a "track" is defined as an end-to-end succession of time slots, with a particular timeslot belonging to at most one track. In this model, a set of input cells (time slots) are uniquely bound to a set of output cells, representing a forwarding state that can be used regardless of the upper layer protocol. This model can effectively be seen as a G-MPLS operation in that the information used to switch is not an explicit label, but rather related to other properties of the way the packet was received, a particular cell in the case of 6TiSCH. As a result, as long as the TSCH MAC (and Layer 2 security) accepts a frame, that frame can be switched regardless of the protocol, whether this is an IPv6 packet, a 6LoWPAN fragment, or a frame from an alternate protocol such as WirelessHART of ISA100.11a.

For a given iteration of a slotframe, the timeslot is associated uniquely with a cell, which indicates the channel at which the timeslot operates for that iteration. A data frame that is forwarded along a track has a destination MAC address set to broadcast or a multicast address depending on MAC support. This way, the MAC layer in the intermediate nodes accepts the incoming frame and the 6top sublayer switches it without incurring a change in the MAC header. In the case of IEEE802.15.4e, this means effectively broadcast, so that along the Track the short address for the destination is set to broadcast, 0xFFFF. Conversely, a frame that is received along a track with a destination MAC address set to this node is extracted from the track stream and delivered to the upper layer. A frame with an unrecognized MAC address may be ignored at the MAC layer and thus is not received at the 6top sublayer.

As noted above, chunk ownership in a TSCH network (e.g., a network implementing 6TiSCH) may be formed by a parent node in a network determining that a particular chunk is not used in its interference domain, the node claiming the chunk, and then defending the chunk against other nodes that attempt to appropriate the chunk while in use. As a result of this process, the parent node has exclusive authority to decide which nodes in its corresponding interference domain can use a particular cell within the appropriated chunk. Said differently, a parent node that appropriates a chunk has the implicitly delegated right to manage the portion of the slotframe that is represented by the chunk (e.g., by orchestrating which transmissions may occur in any of the cells of the chunk). In some implementations as well, appropriation of a chunk can also be requested explicitly by the PCE to any node. In that case, the node still may need to perform the appropriation process to validate that no other node has claimed that chunk already.

Distributed Appropriation and Defense of Time Slot Ownership in a Channel Hopping Schedule The techniques herein allow a network node/device to claim and defend a chunk of cells within a TSCH schedule (e.g., 6TiSCH schedule) using limited-duration energy bursts within a reference cell of the chunk to claim and defend the whole chunk. In other words, an appropriation and defense time slot may be designated for a given chunk and used for purposes of appropriating or defending ownership of the chunk by a node. In further aspects, techniques are disclosed that arbitrate contention when appropriation attempts conflict or duplicate appropriation is detected.

Specifically, according to one or more embodiments of the disclosure as described in detail below, a device in a network receives an indication of an appropriation and defense time slot for a set of time slots in a channel hopping schedule. The device appropriates ownership of the set of time slots using an appropriation window of the appropriation and defense time slot. The device receives an appropriation request from a second device during the appropriation window. In response to receiving the appropriation request, the device sends a defense notification during a defense window of the appropriation and defense time slot.

Illustratively, the techniques described herein may be performed by hardware, software, and/or firmware, such as in accordance with the channel hopping process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols (e.g., IEEE 802.15.4e 6TiSCH, etc.), and as such, may be processed by similar components understood in the art that execute those protocols, accordingly.

Operationally, a CDU matrix (e.g., CDU matrix 500) may be partitioned in a static manner that is known to all network nodes into overlapping or non-overlapping chunks (e.g., as depicted in FIG. 6). This partition may be a well-known regular expression to compress the description, or a full list of the cells in every chunk, in various cases. In one embodiment, at least one reference cell may be assigned within each chunk that is also well known to all network nodes that need to participate in the chunk appropriation process. Such a reference cell in a given chunk may not be used to transfer standard data traffic, but instead used to appropriate or defend ownership of the chunk.

Further, energy peaks may be used within the reference cell that can be detected down the borders of the interference domain of the sender (e.g., as opposed to the reception domain, as would typically be used to convey network traffic).

Figure 9A:
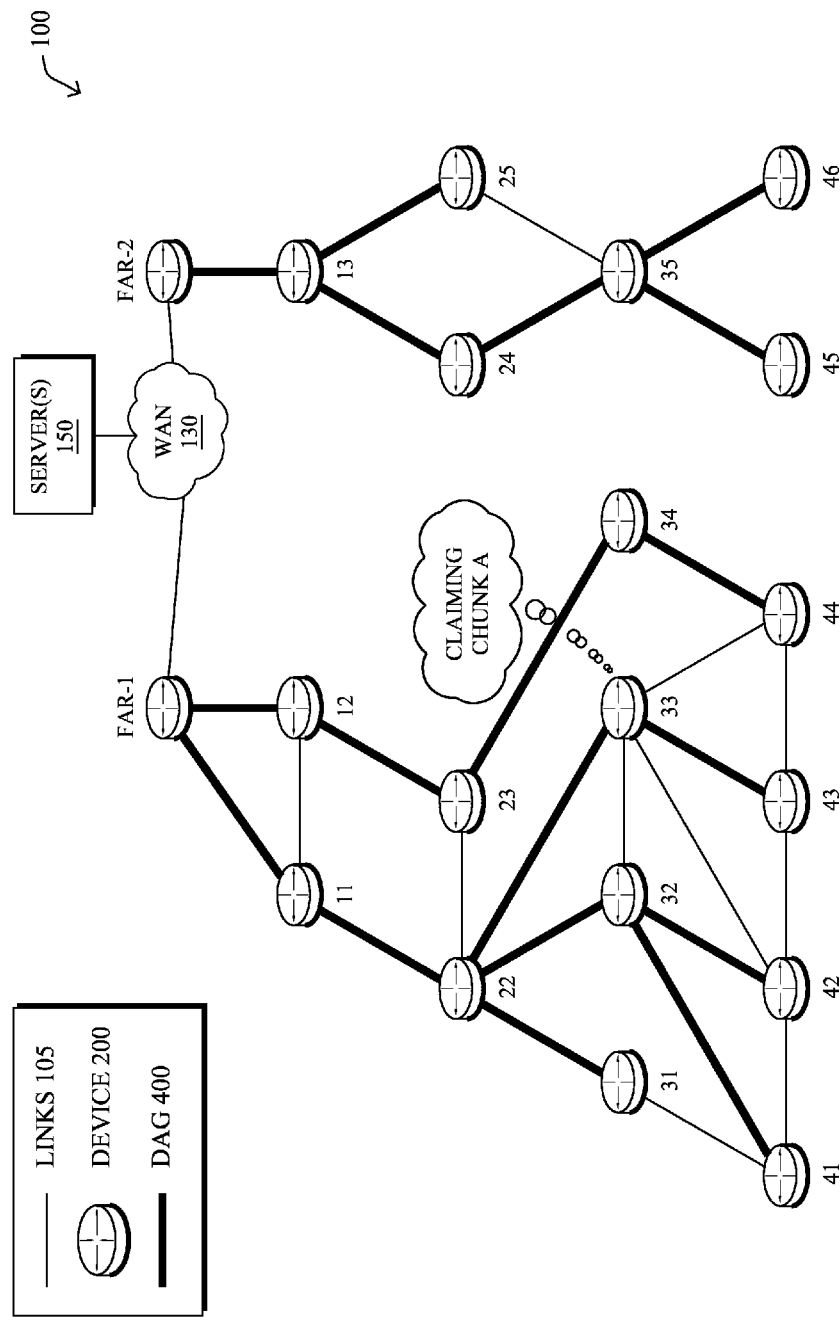
FIGS. 9A-9B illustrate an example of a node attempting to appropriate a chunk of the CDU matrix.
Figure 9B:
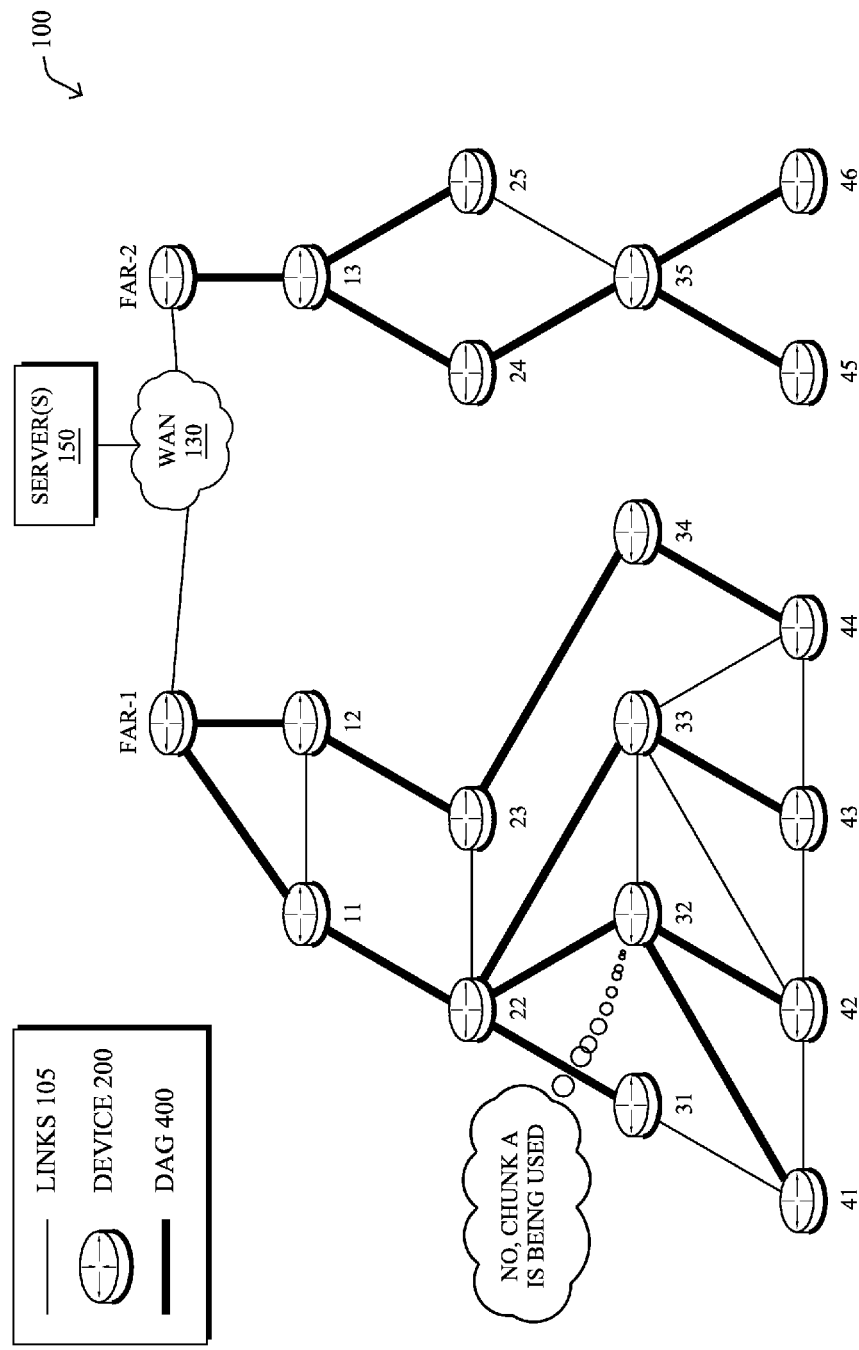

Referring now to FIGS. 9A-9B, an example of a node attempting to appropriate a chunk of the CDU matrix is shown, according to various embodiments. As shown in FIG. 9A, node 33 may attempt to appropriate ownership of chunk A of the CDU matrix by broadcasting a chunk appropriation request during an appropriation and defense time slot associated with the chunk. However, assume that chunk A is already owned by node 32 for purposes of illustration. In such a case, as shown in FIG. 9B, node 32 may respond with a chunk defense reply message during the appropriation and defense time slot of chunk A, to alert node 33 that chunk A has already been claimed.

Figure 10A:
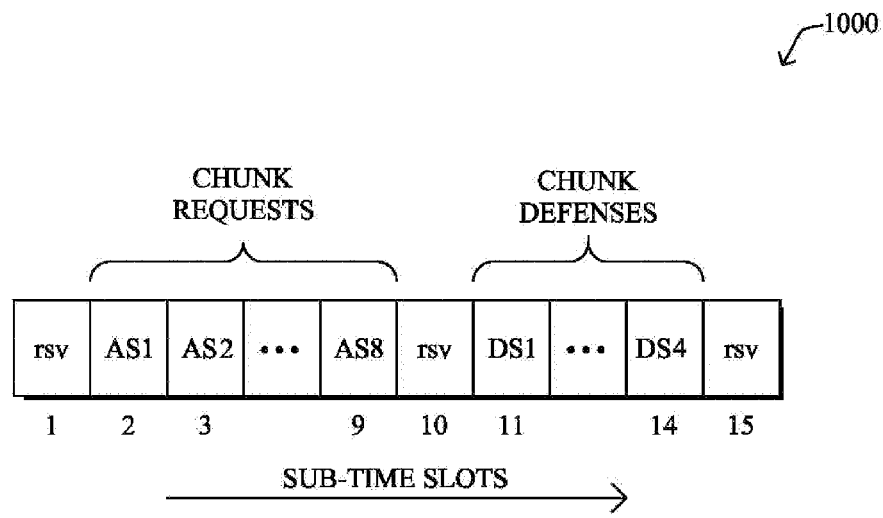
FIGS. 10A-10B illustrate example time slots divided into appropriation and defense windows.
Figure 10B:
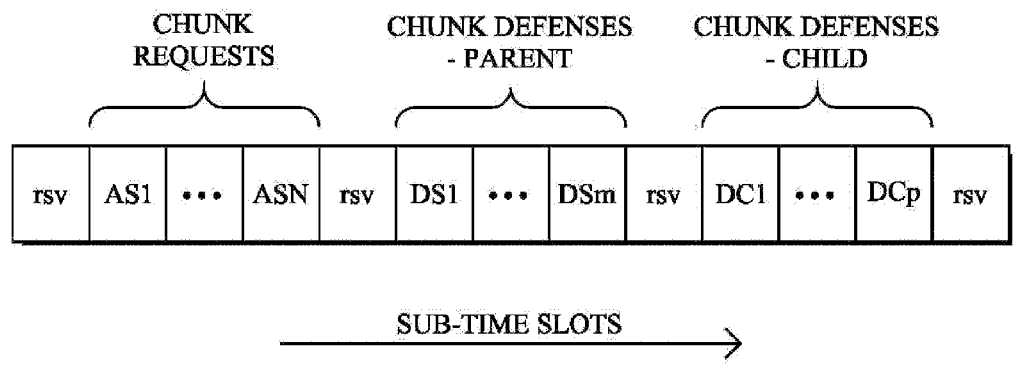

In various embodiments, an appropriation and defense cell (e.g., a time slot N and corresponding channel frequency) associated with a given chunk of a CDU matrix may be divided into sub-slots. For example, as shown in FIGS. 10A-10B, a particular appropriation and defense cell 1000 may be divided into any number of sub-time slots/subcells. Cell 1000 may be divided into any number of subcells (e.g., between 10-15 subcells, etc.) of any duration (e.g., 1 ms each, etc.). Nodes that wish to appropriate the corresponding chunk may then emit a peak of energy in cell 1000 at certain sub-slots known by all surrounding nodes. The sub-slots thus define an appropriation window within the appropriation and defense time slot that may be used by a node to appropriate ownership of the chunk. Notably, the time slot (and sub-slots) of the appropriation and defense cell 1000 may be made available periodically according to the CDU matrix.

In one embodiment, the first ½ to ⅔ of the sub-slots of cell 1000 may be reserved for cell appropriation as an appropriation window during which chunk requests may be sent, as shown in FIG. 10A. For example, sub-slots 2-9 may be designated as appropriation sub-slots AS1-AS8, to form an appropriation window. The appropriation window may then be followed by one or more sub-slots that form a time gap, to account for any lag present between device times (e.g., approximately 1 ms typically in 6TiSCH). Similar time gaps may also be allocated at the beginning and/or end of cell 1000, to avoid polluting transmissions at the edges of the appropriation and defense time slot. The remaining sub-slots of cell 1000 may then be allocated as a defense window in which a node may defend ownership of the corresponding chunk. Thus, in the example shown in FIG. 10A, the first sub-slot may be reserved, followed by eight sub-slots that form an appropriation window, followed by another reserved time slot, followed by four more sub-slots that form a defense window (e.g., defense sub-slots DS1-DS4, and concluded with another reserved time slot. As would be appreciated, the appropriation and defense windows of a cell may include any number of sub-cells.

In another embodiment, as shown in FIG. 10B, cell 1000 may be divided into three subcell windows, instead of the two windows shown in FIG. 10A. As shown, cell 1000 may further be subdivided to include a child defense window (e.g., child defense sub-cells $DC1\text{-}DC_p$), in addition to an appropriation window (e.g., appropriation sub-cells AS1-ASN) and a defense window (e.g., parent defense sub-cells $DS1\text{-}DS_m$) that may be used by the parent to appropriate or defend ownership of the chunk. During the child defense window, a child node of the parent node/chunk owner may also defend ownership of the chunk by its parent. For example, the child node may send a peak of energy during the child defense window of cell 1000, so as not to be confused with any appropriation or defense messages sent between the parent node and another node. Nodes also listen for energy peaks in the whole cell 1000, to determine which other nodes are actively claiming or defending the corresponding chunk. If a separate child defense window is used, the parent node may also distinguish between actual defense attempts made by competing nodes and defense attempts made by its own children on its behalf. Similar to the subdivisions shown in FIG. 10A, the chunk appropriation window, the parent defense window, and the child defense window of cell 1000 may be separated by any number of sub-slots used as gaps to account for device delays.

During an appropriation attempt, a node may compute a random number between 1 and a maximum value that corresponds to the number of sub-slots in the appropriation window. For example, if the appropriation window of a cell includes eight sub-slots, the maximum value represented by the time slots may be 255 (e.g., 1-255 out of $2^8$=256 values). Notably, zero may be excluded as a possible random number since its binary representation would mean no transmission at all during the appropriation window. The node may then emit energy in the sub-slots of the appropriation window that correspond to the binary representation of the random number.

Similar to an appropriation attempt, a node may generate a random number between 1 and a maximum value, during a defense attempt. The maximum value may be based on the number of sub-slots within a defense window (e.g., either a child defense window or a defense window of a parent/chunk owner). For example, a random number may be selected between 1 and 15, if there are four sub-time slots assigned to a defense window (e.g., $2^4$=16 possible values in binary). Zero may also be excluded as a possible random number. Once generated, the node may transmit the binary representation of the random number within the sub-slots of the defense window by emitting a peak of transmission energy, to represent any '1 s' of the binary number. In further embodiments, other forms of appropriation or defense notifications may be sent during their corresponding windows (e.g., a single burst during an appropriation or defense window, a static number, a device identifier, etc.).

A node attempting to claim ownership of a chunk may perform various operations, in response to detecting a transmission during the appropriation and defense cell/timeslot associated with the chunk. For example, if the node that wishes to appropriate the chunk reads energy in the defense window, this means that there is a collision with the chunk owner. In such a case, the node that wishes to appropriate the chunk may yield to the chunk owner, in one embodiment. Conversely, if a chunk owner reads energy in an appropriation window, the node may defend its ownership of the chunk by sending energy in the defense window of the appropriation and defense timeslot, as described previously. In one embodiment, a chunk owner may also transmit within the defense window occasionally, to detect appropriation collisions and proactively deter appropriation attempts by other nodes.

Various cases may also arise in which ownership of a chunk may be contested by two or more nodes. In one case, assume that a node that wishes to appropriate the chunk detects a transmission from another node within the corresponding appropriation window (e.g., potentially at the same time the node sends its own appropriation message). In such a case, neither node has yet to establish its ownership of the chunk. In another case, assume that a chunk owner detects energy transmitted by another node during a defense window. This situation may indicate a state of undetected appropriation collision in which both nodes believe themselves to be owners of the chunk. In these and other cases, both nodes may initiate a contention process by which the nodes determine which contender is deemed owner of the chunk.

Figure 11A:
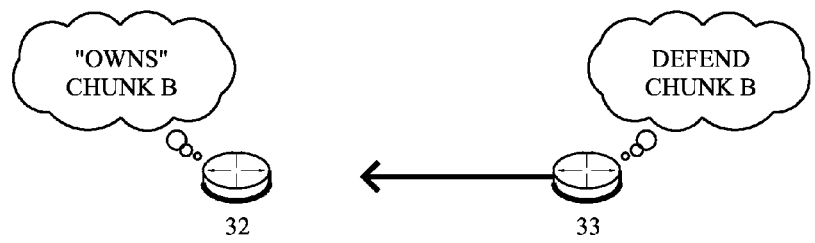
FIGS. 11A-11D illustrate examples of chunk ownership being contested.

Referring now to FIGS. 11A-11D, examples of chunk ownership being contested are illustrated, according to various embodiments. An example of undetected appropriation collision is depicted in FIG. 11A. As shown, assume that node 32 believes itself to be the owner of chunk 'B' and that it receives a defense transmission from node 33 in the corresponding defense window of the appropriation and defense cell for chunk B. Since node 33 has mounted a defense, it can be assumed that node 33 also believes itself to be the owner of chunk B. Both nodes 32 and 33 may then initiate a contest, to decide which of the two nodes retains ownership of the chunk. Note that while two contender nodes are depicted, any number of different nodes in the network may vie for ownership of a chunk using the techniques herein.

Figure 11B:
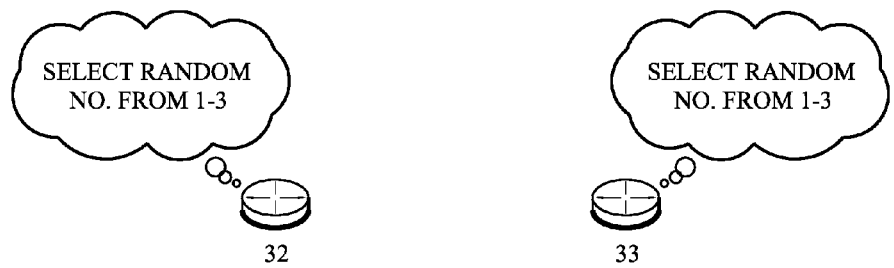

In some embodiments, nodes may contend for ownership of a chunk by selecting a random number between 1 and a set amount. For example, as shown in FIG. 11B, nodes 32 and 33 may each select a random number between '1' and '3,' the value of which may dictate which action will be taken by the node in the contention process. If a node picks '1,' it may retain or gain ownership of the chunk outright. If a node picks '2,' it may lose ownership of the chunk temporarily, but may contend for appropriation in a subsequent round. If a node picks '3,' however, it loses ownership completely and may not contend for appropriation of that chunk again, requiring the node to move on to another chunk. After a few rounds, at least one of the contenders will have abandoned the chunk.

Figure 11C:
Figure 11D:

Using the above approach, there is only one chance out of nine that both nodes will move always from the contest and two out of nine chances that a second round will need to be played. In the other ⅔ of the cases, the contention is solved at the next round because either one node backs away from the contest or only one node is still the owner of the chunk. For example, as shown in FIG. 11C, node 32 may retain ownership of chunk B if it selects a '1' and node 33 may lose ownership of the chunk, but can try again later, if it selects a '2.' However, if node 33 instead selects a '3' and node 32 selects a '1,' node 33 may be barred from attempting again to gain ownership of chunk B.

Figure 12:
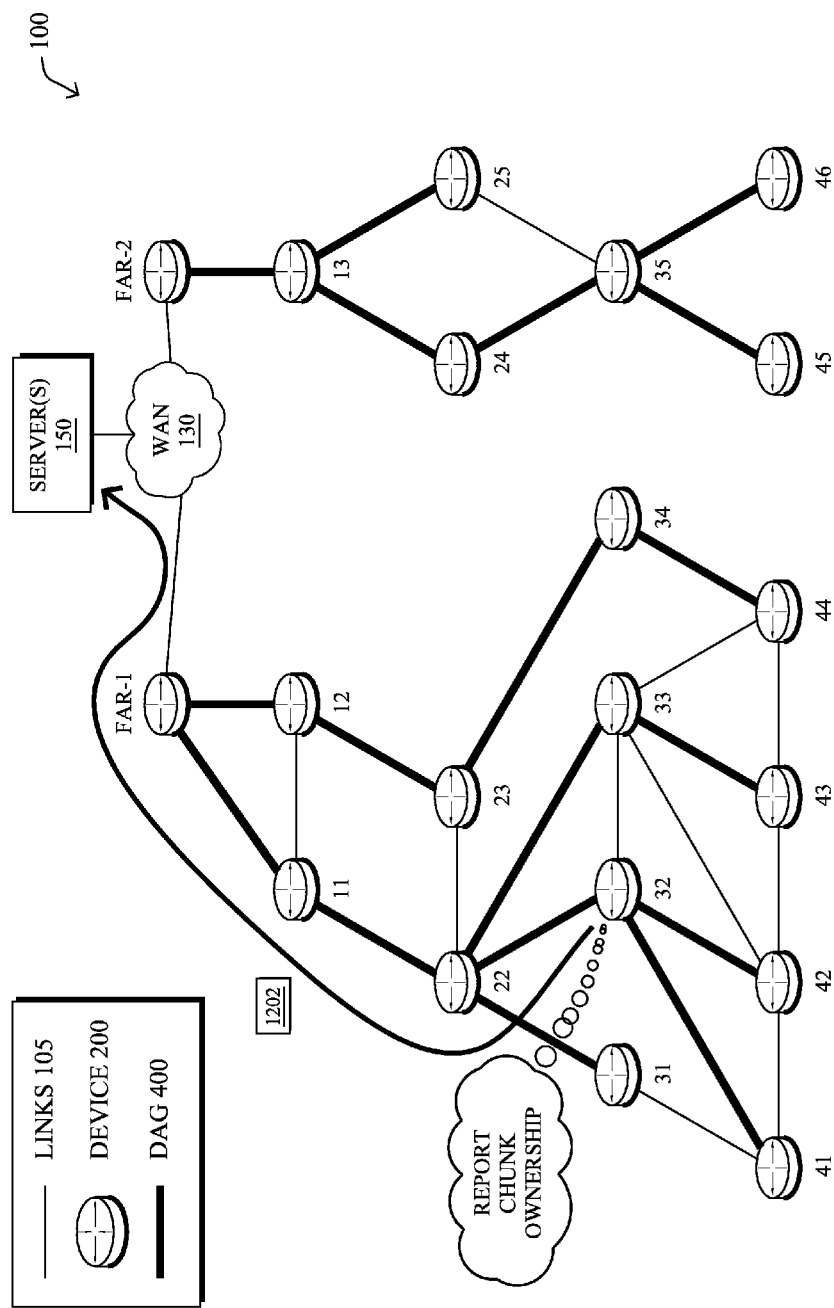
FIG. 12 illustrates an example of chunk ownership being reported to a central network device.

In another embodiment, the node may report the chunk ownership to the PCE/NMS using a custom message (e.g., over CoAP, etc.). For example, as shown in FIG. 12, node 32 may send a message 1202 to a PCE or NMS (e.g., one of servers 150) that notifies the PCE or NMS that node 32 owns chunk B. In some embodiments, this information may be used by the PCE or NMS to ensure that chunks are allocated in a fair and reasonable manner, thereby preventing starvation of allocated chunks within a certain region of the network. For example, the PCE may instruct a given node to release a chunk and/or suggest an alternative chunk that the node can claim.

Figure 13:
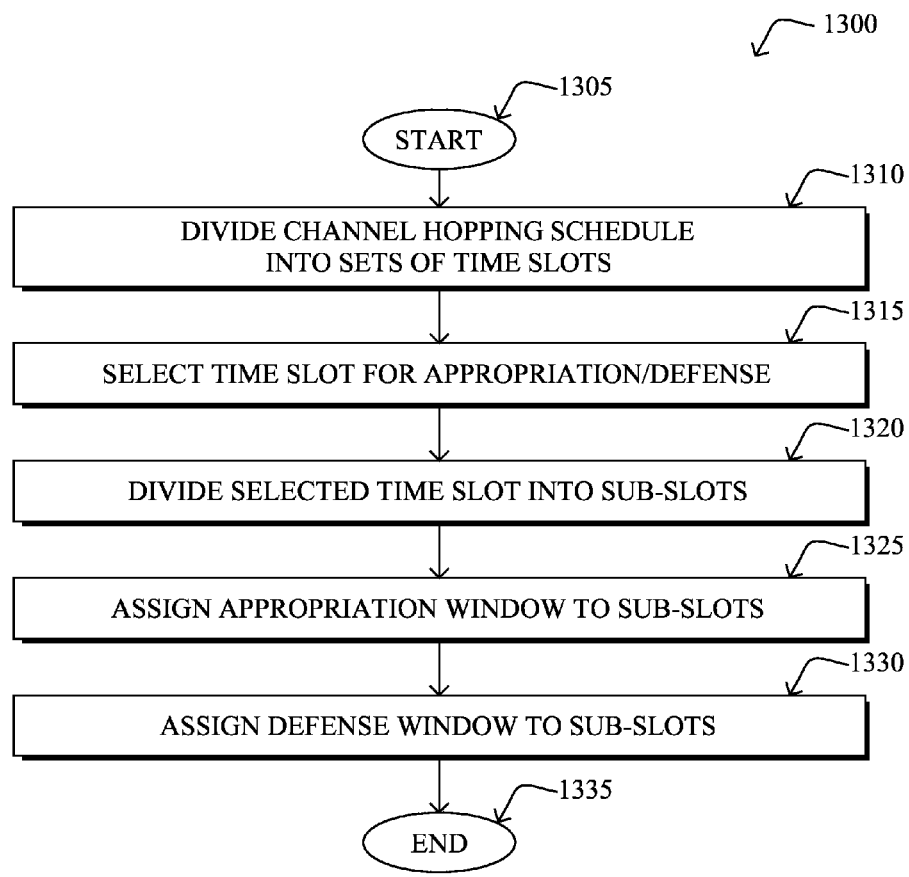
FIG. 13 illustrates an example simplified procedure for generating an appropriation and defense time slot.

FIG. 13 illustrates an example simplified procedure for generating an appropriation and defense time slot, in accordance with one or more embodiments described herein. The procedure 1300 may start at step 1305, and continues to step 1310, where, as described in greater detail above, a channel hopping schedule is divided into sets of time slots. For example, as detailed above, a TSCH schedule may be divided into 'cells' that relate a time slot to a channel/frequency over which a network node may communicate wirelessly. Also as detailed above, the cells (e.g., time slots and associated channels) may be grouped into 'chunks,' where each chunk represents a set of 'cells' within the CDU matrix.

At step 1315, a time slot is selected as an appropriation and defense time slot for a particular set of time slots, as described in greater detail above. For example, a particular cell within a TSCH chunk may be selected as an appropriation and defense time slot for the chunk. During such a time slot/cell, nodes may vie for 'ownership' of the chunk. In other words, a network node that owns the chunk has the delegated authority to assign TSCH time slots/cells to its child nodes, to be used by the child nodes for wireless communications.

At step 1320, the selected appropriation and defense time slot is divided into sub-slots, as detailed above. The time slot may be divided into any number of sub-slots with each sub-slot having the same or varying durations. For example, if the time slot is 15 ms long, the time slot may be divided into fifteen sub-slots, each having a duration of 1 ms. In one embodiment, the duration of a sub-slot may be selected based on a maximum delay between nodes. In such a case, one or more of the sub-slots may be reserved within the appropriation and defense time slot to account for such delays.

At step 1325, an appropriation window is assigned to sub-slots of the appropriation and defense time slot, as described in greater detail above. In general, the sub-slots of the appropriation window may be used by a node to claim ownership of the set of time slots (e.g., chunk) associated with the appropriation and defense time slot. In one embodiment, the sub-slots of the appropriation window may be used to represent a binary number randomly selected by a node attempting to appropriate the chunk. Transmitting the number during the appropriation window may then entail sending a transmission of peak energy during the sub-time slots that correspond to is in the binary number.

At step 1330, a defense window is assigned to sub-slots of the appropriation and defense time slot, as detailed above. During the defense window, a chunk owner may launch a defense against another node attempting to claim ownership of the chunk. Similar to the appropriation window, the chunk owner may generate a random binary number and represent the number using the sub-slots of the defense window. In particular, the defending chunk owner may transmit bursts of energy during the sub-slots that correspond to is of the randomly generated number. In some embodiments, the defense window may be divided into a primary defense window in which a chunk owner is able to defend its ownership of the chunk and one or more child defense windows in which a child node of the chunk owner is also able to defend ownership of the chunk by its parent. Procedure 1300 then ends at step 1335.

Figure 14:
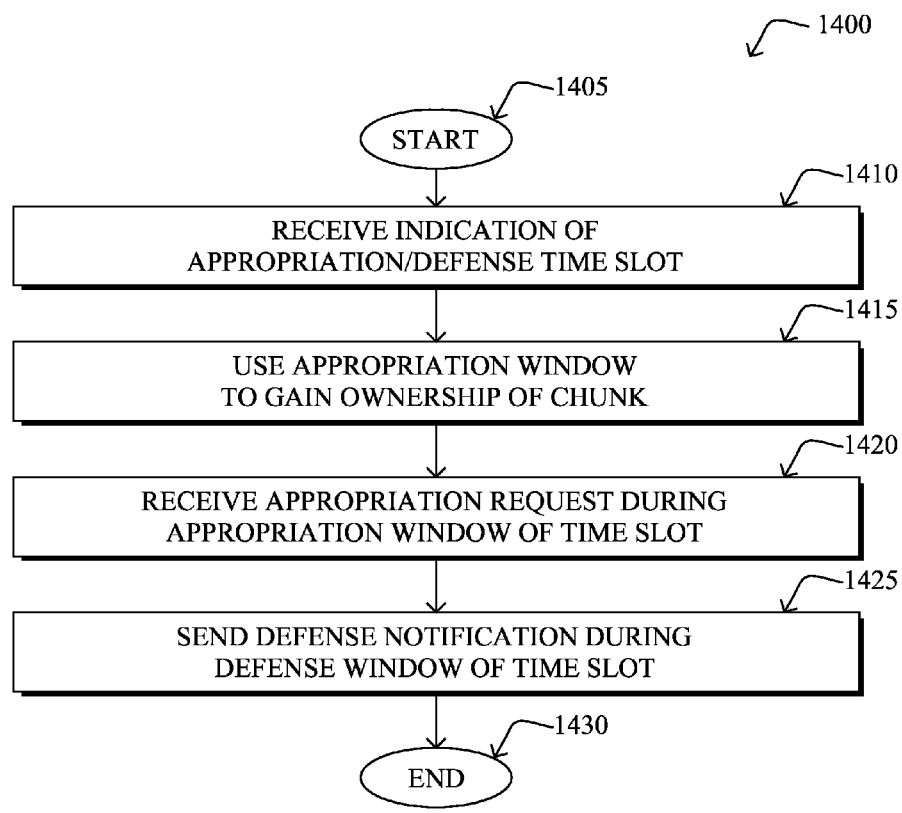
FIG. 14 illustrates an example simplified procedure for defending an appropriated chunk.

FIG. 14 illustrates an example simplified procedure for defending an appropriated chunk, in accordance with one or more embodiments described herein. The procedure 1400 may start at step 1405, and continues to step 1410, where, as described in greater detail above, a network node may receive an indication of an appropriation and defense time slot. For example, the time slot may be part of a cell of a TSCH schedule that maps a wireless communication channel with a span of time. In various embodiments, the appropriation and defense time slot may be identified network wide or within a particular geographic area of the network. In other words, some or all of the nodes that may vie for ownership of the chunk may be notified of the appropriation and defense time slot associated with the chunk. Also as noted above, in some embodiments, the appropriation and defense time slot may be subdivided into an appropriation window through which a node may claim ownership of the chunk and one or more defense windows in which a node can defend against a rival ownership claim.

At step 1415, the appropriation window of the appropriation and defense time slot may be used by a node to gain ownership of the chunk, as described in greater detail above. For example, in some cases, a node may claim ownership by transmit a randomly generated binary number as a set of 'pulses' of energy during sub-slots of the appropriation window, to represent the binary number. Assuming that no other node initiates a defense of the chunk during the defense window of the time slot, the node may consider itself to be the owner of the chunk and use the chunk to assign cells of the chunk to its child node(s).

At step 1420, the chunk owner may receive an appropriation request from another node during the appropriation window of the appropriation and defense time slot, as detailed above. In other words, another node may attempt to claim ownership of the chunk already owned by the chunk owner. For example, any transmission received by the chunk owner during the appropriation window may be treated by the chunk owner as an attempt that must be defended.

At step 1425, as described in greater detail above, the chunk owner may send a defense notification during the defense window of the appropriation and defense time slot. For example, the chunk owner may send one or more transmissions during sub-slots of the defense window that represent a randomly generated number. Such a defense notification may then be treated by the node attempting to claim ownership of the chunk as an indication that the chunk is unavailable. Procedure 1400 then ends at a step 1430.

Figure 15:
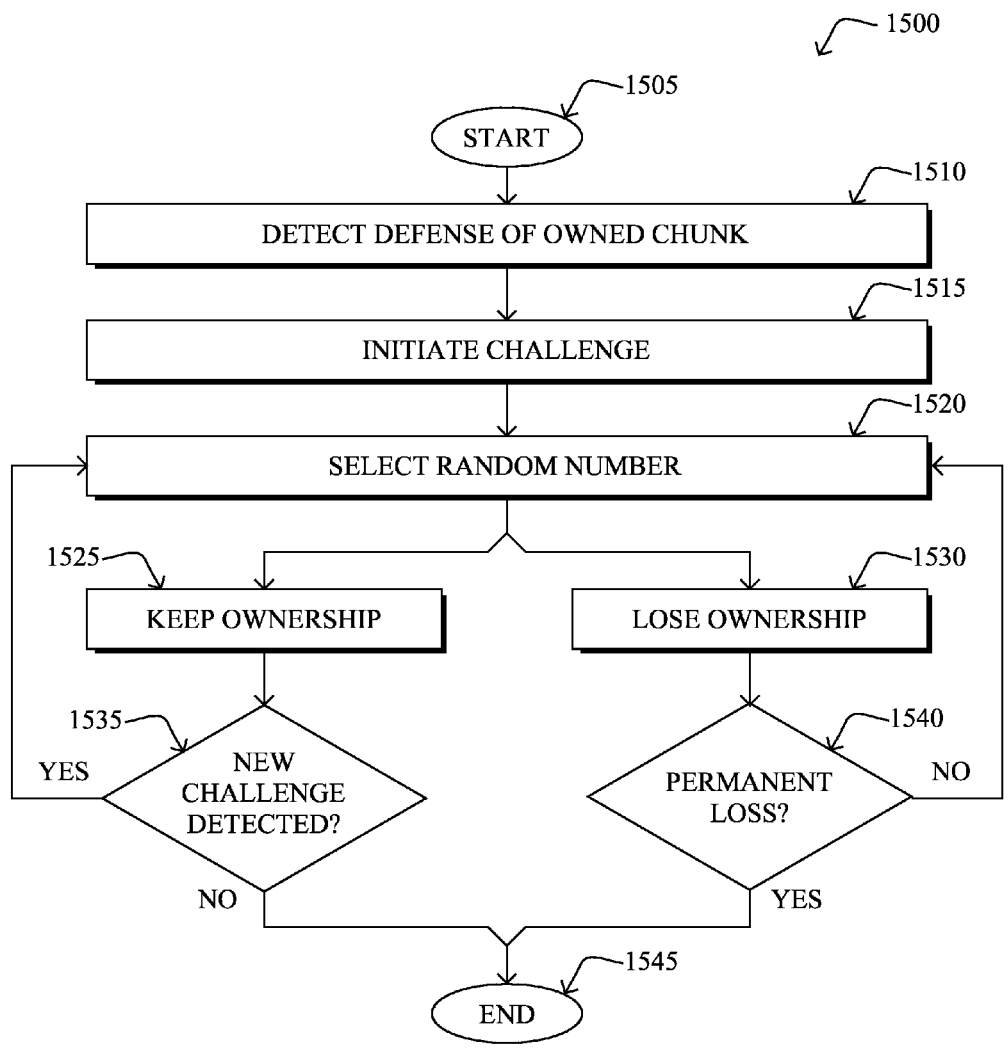
FIG. 15 illustrates an example simplified procedure for settling contested ownership of a chunk.

FIG. 15 illustrates an example simplified procedure for settling contested ownership of a chunk, in accordance with one or more embodiments described herein. The procedure 1500 may start at step 1505, and continues to step 1510, where, as described in greater detail above, a network node may detect a defense of a chunk owned by the node that was launched by another node. For example, changing node locations, changing interference conditions, etc., may result in two nodes that both believe they own the same chunk coming into range of one another. In such cases, if the second node launches a defense of the chunk, the first node that also believes itself to be the chunk owner may treat this condition as a previously undetected form of contention.

At step 1515, a challenge may be initiated by the node that detected the defense launched by the other node, as described in greater detail above. For example, the detecting node may notify the other node that a challenge is to begin, to determine rightful ownership of the chunk. In various embodiments, the notification may be sent using the appropriation and defense time slot for the chunk or at any other time.

At step 1520, each node participating in the challenge may select a random number, as detailed above. In various embodiments, the number may be selected randomly from a range of values that each corresponds to a different action to be performed by the node in the challenge. For example, a range of 1-3 may be used to represent three possible actions that may be taken by a node as part of the challenge. Any number range and/or or possible actions may be used, according to various embodiments.

At step 1525, a decision may be made based on the random number that a given node is to keep ownership of the chunk, as detailed above. For example, if a node randomly picks '1' out of a range of 1-3, the node may consider itself to be the owner of the chunk. Procedure 1500 then proceeds to step 1535 where a decision is made as to whether or not a new challenge has been detected. If a new challenge has not been detected, procedure 1500 may then continue on to step 1545 where it ends. However, if a new challenge has been detected, a new round of the challenge may be initiated. For example, if both nodes randomly selected '1,' the challenge may be repeated, to determine which of the two nodes retains ownership of the chunk.

At step 1530, a node participating in the challenge may determine that it has lost ownership of the chunk based on the randomly selected number, as detailed above. For example, if a node randomly selected a '2' or a '3' from the range of 1-3, it may determine that it has lost ownership rights to the chunk. Procedure 1500 may then continue on to step 1540 where a decision is made as to whether or not the loss of ownership is permanent. If it is, procedure 1500 then continues on to step 1545 and ends. However, in some embodiments, the number selected randomly in step 1520 may indicate that the loss of ownership rights is temporary and that the node is able to vie for ownership of the chunk again at a later time. For example, procedure 1540 may return to step 1520 if a new round of the challenge is to take place (e.g., none of the competing nodes definitively won ownership in the previous round). Any number of rounds may be performed until one or potentially all challengers decide to give up competing for ownership of the chunk and procedure ends at step 1545.

It should be noted that while certain steps within procedures 1300-1500 may be optional as described above, the steps shown in FIGS. 13-15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1300-1500 are described separately, certain steps from each procedure may be incorporated into each other procedure, and the procedures are not meant to be mutually exclusive.

The techniques described herein, therefore, provide for a mechanism whereby network nodes may claim, defend, and/or compete for ownership of a chunk. According to some aspects, only one cell per chunk is 'wasted' by the negotiation process. In some cases, appropriation or defense notifications may be sent as bursts of peak energy, allowing contenders to be detected within a sender's interference domain as opposed to its reception range. Outside that domain, the chunk may be reused and claimed by another node, in some embodiments.

While there have been shown and described illustrative embodiments that provide for the arbitration of time contention in a shared-media communication network, it is to be understood that various other adaptations and modifications may be made within the spirit and scope of the embodiments herein. For example, the embodiments have been shown and described herein primarily with respect to LLNs. However, the embodiments in their broader sense are not as limited, and may, in fact, be used with other types of networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   dividing, by a device in a network, a channel hopping schedule into sets of time slots, wherein the time slots in a particular set are associated with corresponding wireless channels;
   selecting, by the device, a time slot in the particular set of time slots as an appropriation and defense time slot that can be used by nodes in the network to vie for ownership of the set of time slots;
   dividing, by the device, the selected time slot into a plurality of sub-slots;
   assigning, by the device, an appropriation window to one or more of the sub-slots that can be used by a first one of the network nodes to claim ownership of the particular set of time slots; and
   assigning, by the device, a defense window to one or more of the sub-slots that can be used by the first network node to defend against a claim of ownership of the particular set of time slots by a second one of the network nodes.

2. The method as in claim 1, further comprising:
   assigning, by the device, a child defense window to one or more of the sub-slots that can be used by a child node of the first network node to defend against the claim of ownership by the second node.

3. The method as in claim 1, wherein the first network node claims ownership of the set of time slots by transmitting a binary representation of a number in corresponding sub-slots of the appropriation window.

4. The method as in claim 3, wherein the number is randomly generated by the first node.

5. The method as in claim 1, further comprising:
   notifying, by the device, the first and second network nodes of the appropriation and defense windows of the time slot.

6. A method comprising:
   receiving, at a device in a network, an indication of an appropriation and defense time slot for a set of time slots in a channel hopping schedule;
   appropriating, by the device, ownership of the set of time slots using an appropriation window of the appropriation and defense time slot;
   receiving, at the device, an appropriation request from a second device during the appropriation window; and,
   in response to receiving the appropriation request, sending, by the device, a defense notification during a defense window of the appropriation and defense time slot.

7. The method as in claim 6, further comprising:
   assigning, by the device, communication schedules to one or more child nodes of the device using the set of time slots.

8. The method as in claim 6, wherein sending the defense notification comprises:
   s generating, by the device, a random binary number; and
   transmitting a binary representation of the number in corresponding sub-slots of the appropriation window.

9. The method as in claim 6, further comprising:
   notifying, by the device, a path computation element (PCE) in the network of the ownership of the set of time slots by the device.

10. The method as in claim 6, further comprising:
    receiving, at the device, a defense notification from a particular network node during the defense window of the appropriation and defense time slot; and initiating, by the device, a challenge with the particular network node for ownership of the set of time slots.

11. The method as in claim 10, further comprising:
selecting, by the device, a random number; and
determining that the device is to retain ownership of the set of time slots based on the random number.

12. The method as in claim 10, further comprising:
selecting, by the device, a random number; and
determining that the device has lost ownership of the set of time slots based on the random number.

13. The method as in claim 12, wherein determining that the device has lost ownership of the set of time slots comprises:
determining that the device has lost ownership of the set of time slots temporarily; and
initiating a new challenge with the particular network node for ownership of the set of time slots.

14. The method as in claim 12, wherein determining that the device has lost ownership of the set of time slots comprises:
determining that the device has lost ownership of the set of time slots permanently.

15. An apparatus, comprising:
one or more network interfaces to communicate with a network;
a processor coupled to the network interfaces and configured to execute one or more processes; and
a memory configured to store a process executable by the processor, the process when executed operable to:
divide a channel hopping schedule into sets of time slots, wherein the time slots in a particular set are associated with corresponding wireless channels;
select a time slot in a particular set of time slots as an appropriation and defense time slot that can be used by nodes in the network to vie for ownership of the particular set of time slots;
divide the selected time slot into a plurality of sub-slots;
assigning, by the device, an appropriation window to one or more of the sub-slots that can be used by a first one of the network nodes to claim ownership is of the particular set of time slots; and
assign a defense window to one or more of the sub-slots that can be used by the first network node to defend against a claim of ownership of the particular set of time slots by a second one of the network nodes.

16. The apparatus as in claim 15, wherein the process when executed is further operable to:
assign a child defense window to one or more of the sub-slots that can be used by a child node of the first network node to defend against the claim of ownership by the second node.

17. The apparatus as in claim 15, wherein the first network node claims ownership of the set of time slots by transmitting a binary representation of a number in corresponding sub-slots of the appropriation window.

18. The method as in claim 17, wherein the number is randomly generated by the first node.

19. The apparatus as in claim 15, wherein the process when executed is further operable to:

notifying, by the device, the first and second network nodes of the appropriation and defense windows of the time slot.

20. An apparatus, comprising:
one or more network interfaces to communicate with a network;
a processor coupled to the network interfaces and configured to execute one or more processes; and
a memory configured to store a process executable by the processor, the process when executed operable to:
receive an indication of an appropriation and defense time slot for a set of time slots in a channel hopping schedule;
appropriate ownership of the set of time slots using an appropriation window of the appropriation and defense time slot;
receive an appropriation request from a second device during the appropriation window; and,
in response to receiving the appropriation request, send a defense notification during a defense window of the appropriation and defense time slot.

21. The apparatus as in claim 20, wherein the process when executed is further operable to:
assign communication schedules to one or more child nodes of the apparatus using the set of time slots.

22. The apparatus as in claim 20, wherein sending the defense notification comprises:
generating a random binary number; and
transmitting a binary representation of the number in corresponding sub-slots of the appropriation window.

23. The apparatus as in claim 20, wherein the process when executed is further operable to:
receive a defense notification from a particular network node during the defense window of the appropriation and defense time slot; and
initiate a challenge with the particular network node for ownership of the set of time slots.

24. The apparatus as in claim 23, wherein the process when executed is further operable to:
select a random number; and
determine that the apparatus is to retain ownership of the set of time slots based on the random number.

25. The apparatus as in claim 23, further comprising:
select a random number; and
determine that the apparatus has lost ownership of the set of time slots based on the random number.

26. The apparatus as in claim 25, wherein determining that the device has lost ownership of the set of time slots comprises:
determining that the device has lost ownership of the set of time slots temporarily; and
initiating a new challenge with the particular network node for ownership of the set of time slots.

27. The apparatus as in claim 25, wherein determining that the device has lost ownership of the set of time slots comprises:
determining that the device has lost ownership of the set of time slots permanently.

* * * * *